United States Patent
Lagnado et al.

(10) Patent No.: US 11,068,430 B2
(45) Date of Patent: Jul. 20, 2021

(54) CONFIGURATION PARAMETER TRANSFER (71) Applicant: Hewlett-Packard Development Company, L.P., Spring, TX (US)

(72) Inventors: Isaac Lagnado, Houston, TX (US); Jeffrey K Jeansonne, Houston, TX (US); Roger D Benson, Houston, TX (US); Ho-Sup Chung, Houston, TX (US); Rahul V Lakadwala, Houston, TX (US); Steven Petit, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 43 days.

(21) Appl. No.: 16/603,297

(22) PCT Filed: Apr. 24, 2017

(86) PCT No.: PCT/US2017/029210
§ 371 (c)(1),
(2) Date: Oct. 7, 2019

(87) PCT Pub. No.: WO2018/199908
PCT Pub. Date: Nov. 1, 2018

(65) Prior Publication Data
US 2021/0109884 A1   Apr. 15, 2021

(51) Int. Cl.
*G06F 13/40*   (2006.01)
*G06F 13/24*   (2006.01)
*G06F 13/42*   (2006.01)

(52) U.S. Cl.
CPC .......... *G06F 13/4068* (2013.01); *G06F 13/24* (2013.01); *G06F 13/4282* (2013.01); *G06F 2213/0042* (2013.01)

(58) Field of Classification Search
CPC .. G06F 13/4068; G06F 13/24; G06F 13/4282; G06F 2213/0042
See application file for complete search history.

(56) References Cited

U.S. PATENT DOCUMENTS

| 5,671,355 A | 9/1997 | Collins |
| 6,282,642 B1 * | 8/2001 | Cromer ................. G06F 9/4416 713/1 |

(Continued)

FOREIGN PATENT DOCUMENTS

| WO | WO-2006108257 A1 | 10/2006 |
| WO | WO-2016099627 A1 | 6/2016 |

OTHER PUBLICATIONS

Configuration—Security Avaya Ethernet Routing Switch 5000 Series, May 2014, <https://downloads.avaya.com/css/P8/documents/100122355 >.

(Continued)

*Primary Examiner* — Idriss N Alrobaye
*Assistant Examiner* — Ronald T Modo
(74) *Attorney, Agent, or Firm* — Brooks, Cameron & Huebsch, LLC (57) ABSTRACT

Examples relate to configuration parameter transfer. An apparatus may include a memory resource storing executable instructions. Instructions may include instructions to receive a first signal from a host computing device. Instructions may further include instructions to initiate communications with the host computing device in response to receiving the first signal. Instructions may further include instructions to receive a configuration parameter from the host computing device in response to initiation of communications with the host computing device. The apparatus may further include a processing resource to execute the instructions stored on the memory resource.

14 Claims, 4 Drawing Sheets

(56) References Cited

U.S. PATENT DOCUMENTS

| | | |
|---|---|---|
| 7,251,736 B2 | 7/2007 | Dayan et al. |
| 2006/0112287 A1 | 5/2006 | Paljug |
| 2010/0121820 A1* | 5/2010 | Thapa ................. H04L 12/10 |
| | | 707/641 |
| 2012/0210112 A1 | 8/2012 | Suganami |
| 2013/0103861 A1 | 4/2013 | Ahn et al. |
| 2015/0016417 A1* | 1/2015 | Dees ................... H04W 88/08 |
| | | 370/331 |
| 2015/0370299 A1 | 12/2015 | Waters |
| 2016/0299561 A1 | 10/2016 | Middleton et al. |
| 2016/0378704 A1 | 12/2016 | Adamson et al. |
| 2017/0222829 A1* | 8/2017 | Kessler ............. H04L 12/40039 |

OTHER PUBLICATIONS

Intel vPro Processor Technology Setup and Configuration for the HP Z1, Z210, Z420, Z620 and Z820 Workstations, <https://www.itcreations.com/user-manuals/Intel/intel-hp-z-series.pdf>.

* cited by examiner

CONFIGURATION PARAMETER TRANSFER

BACKGROUND

Computing devices may use external, peripheral devices, such as docks, to perform some of the functionality that was once performed on the computing device itself. As functionalities are offloaded from computing devices to external peripheral devices, increased communication between a computing device and a peripheral device may ensure that the computing device and peripheral device are performing as a unified system.

DETAILED DESCRIPTION

Mobile computing devices, such as laptops, notebooks, and the like, are becoming smaller and lighter. While this may result in increased portability and ease of use, there also may be a decrease in the availability of space on the device itself for various input/output ports. However, peripheral devices, such as docks, may have space available for input/output ports. As a result, input/output ports, and the computing performed by the ports, may be offloaded onto docks. When connected to a host computing device, such as a laptop or notebook, the dock may extend and expand the functionalities of the host computing device.

A dock network interface may have a Media Access Control (MAC) address which serves to uniquely identify the dock associated therewith. However, the MAC address of the dock may be different from the MAC address of the host computing device. As a result, each networking component of the overall system may have its own unique identifier. This may pose network security issues, because while a particular dock may be trusted, the device attached to the dock may not be trusted. Furthermore, it may not be possible to uniquely identify a trusted device attached to the network via a dock that presents the same address regardless of which host device is attached. For example, in a shared workspace environment, a docking device may have a different host device attached to it each day. As a result, a configuration between the host device and the dock may be performed to allow the network infrastructure to uniquely identify a particular host device attached via a docking station or externally attached network adapter.

However, in some examples, configuration parameters may only be transferred between a host computing device and a dock when the host computing device is in an active state. Thus, when a host computing device is coupled to a dock, configuration may not occur if the host computing device is turned off or is in a low-power state, such as sleep mode. While it may be possible to turn the computing device on to enable configuration, this may take additional time. During the time the host computing device is booting, configuration parameters may not be transferred. This may result in a situation in which the host device temporarily connects to the network infrastructure using a network address that does not uniquely identify that host.

Configuration parameter transfer according to the present disclosure, by contrast, may occur as soon as a host computing device is attached to a dock, regardless of the power state of the host computing device. In some examples, the host computing device may couple to a dock via a Universal Serial Bus (USB) Type C connection. A communication channel within the USB Type C connector may begin communications between the host computing device and the dock upon connection. The communications may include negotiating a communications connection between the host computing device and the dock, and transferring a configuration parameter to the dock from the host computing device, or vice versa.

Figure 1:
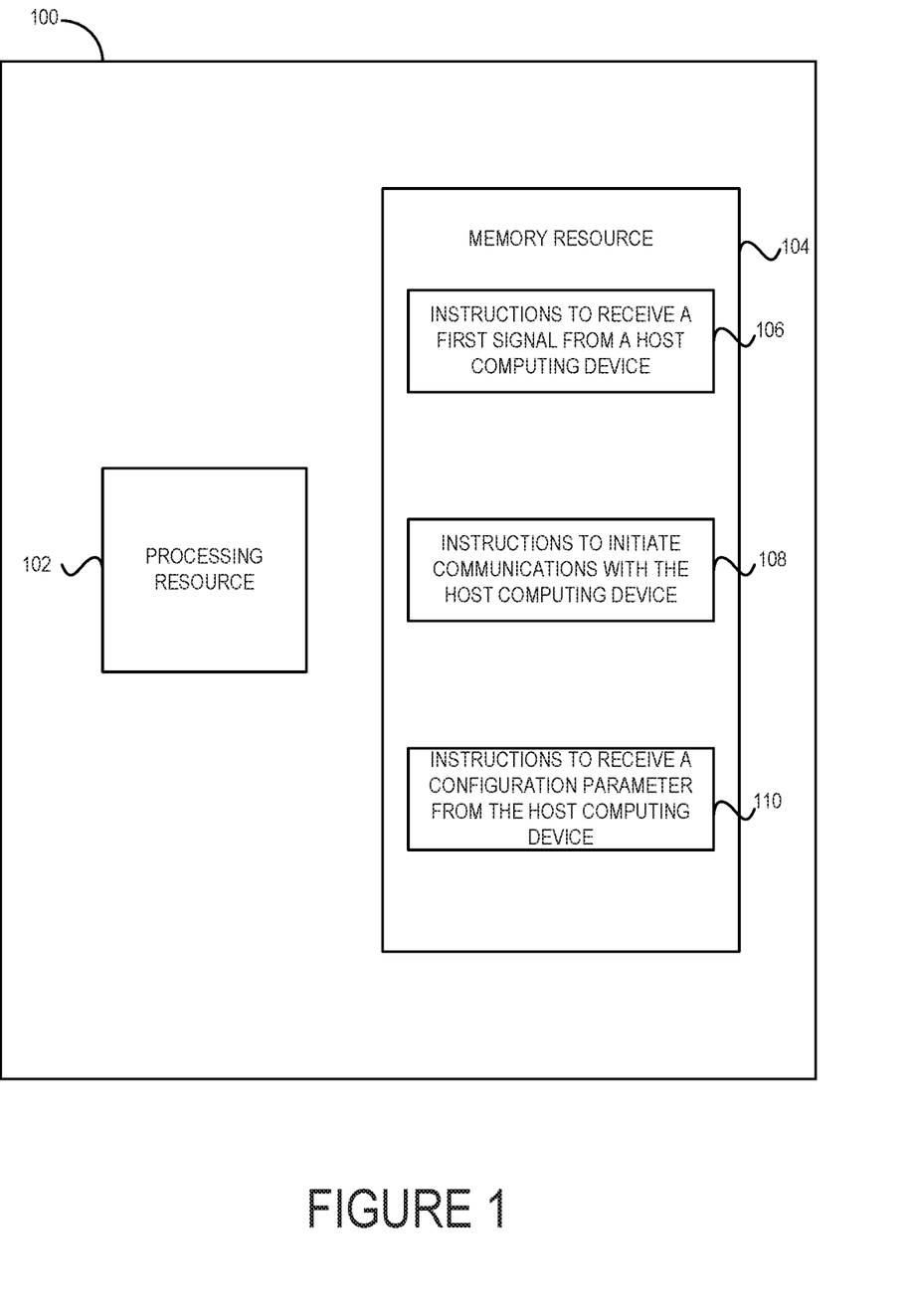
FIG. 1 is an example apparatus for configuration parameter transfer consistent with the disclosure.

FIG. 1 is an example apparatus 100 for configuration parameter transfer according to the present disclosure. Apparatus 100 may be a network peripheral device, such as a docking device of external network adapter, and may couple to a host computing device. As used herein, a host computing device can, for example, refer to a device including a processing resource, memory, and input/output interfaces for wired and/or wireless communication. For example, a client device may include a laptop computer, a desktop computer, a mobile device, and/or other wireless devices, although examples of the disclosure are not limited to such devices. In some examples, apparatus 100 may couple to a host computing device via a Universal Serial Bus (USB) Type C connector. As used herein, a USB Type C connector refers to a connector to transfer data between devices. For example, a USB Type C connector may be used to transfer data between a host computing device and an apparatus such as apparatus 100.

Apparatus 100 may include a processing resource 102. Apparatus 100 may further include a memory resource 104, on which may be stored instructions, such as instructions 106, 108, and 110. Although the following descriptions refer to a single processing resource and a single memory resource, the descriptions may also apply to a system with multiple processing resources and multiple memory resources. In such examples, the instructions may be distributed (e.g., stored) across multiple memory resources and the instructions may be distributed (e.g., executed by) across multiple processing resources.

Processing resource 102 may be a central processing unit (CPU), a semiconductor based microprocessor, and/or other hardware devices suitable for retrieval and execution of instructions stored in memory resource 104. Processing resource 102 may fetch, decode, and/or execute instructions 106, 108, 110, or a combination thereof. As an alternative or in addition to retrieving and executing instructions, processing resource 102 may include at least one electronic circuit that includes electronic components for performing the functionality of instructions 106, 108, 110, or a combination thereof.

Instructions 106, when executed by processing resource 102, may cause the processing resource to receive a first signal from a host computing device. As used herein, a signal refers to an electronic communication or message transmitted by an electronic device, such as a host computing device. In some examples, the signal may be transmitted to apparatus 100 via a USB Type C connector. The signal may be an interrupt signal. As used herein an interrupt signal refers to a signal indicating that an event needing attention has occurred. For example, an interrupt signal may be sent in response to a determination that a peripheral device, such as apparatus 100, has been connected to a host computing device. The interrupt signal may serve to alert a system that the apparatus has been connected and may be configured.

Instructions 108, when executed by processing resource 102, may cause the processing resource to initiate communications with the host computing device. In some examples, initiating communications with the host computing device may include transmitting messages and/or signals between the host computing device and the apparatus 100 to establish a connection between the host computing device and the apparatus 100. In some examples, the communication may be initiated using a USB Type-C connection between the host computing device and the apparatus 100.

Instructions 110, when executed by processing resource 102, may cause the processing resource to receive a configuration parameter from the host computing device. As used herein, a configuration parameter refers to a particular arrangement of hardware, instructions, and/or firmware. For example, a configuration parameter may relate to a particular setting, a particular hardware configuration, or a particular control setting. In some examples, the configuration parameter may be transferred to the host computing device in response to the initiation of communication between the apparatus 100 and the host computing device.

The configuration parameter may be transferred by the host computing device and received at the apparatus 100 via, for example, a USB Type C connector. In some examples, the host computing device may be in a non-active power state when the configuration parameter is transferred. For example, the host computing device may be in an S0, or standby state, in which the host computing device is in a low-power state. The host computing device may further be in an S1, S2, or S3 state, or a sleep state. In some examples, the host computing device may be in an S4, or hibernate state, in which the host computing device may be powered down. In an S4 state, applications and documents in use at the time the host computing device is placed in hibernation mode may be saved to a hard disk or to any other type of non-volatile storage of the host computing device. In some examples, the host computing device may be in an S5, or shutdown state. Examples are not so limited, however, and a configuration parameter may be transferred from the host computing device in any non-active power state.

In some examples, the host computing device may transfer a Host Based Media Access Control Address (HBMA) to the apparatus 100. As used herein, a Media Access Control (MAC) address is a unique identifier assigned to a network interface. The MAC address may be used to facilitate communications between network interfaces. For example, apparatus 100 may have a unique MAC address and the host computing device may have an HBMA. As used herein, an HBMA refers to the MAC address of the host computing device. The HBMA may be stored in a Basic Input/Output Setting memory or in a Network Interface Card (NIC) device. In some examples, the host computing device may transfer the HBMA to the apparatus 100 in response to receiving the configuration parameter from the apparatus 100.

In some examples, apparatus 100 may further include a Wake on Local Area Network (WOL) mechanism. As used herein, a WOL mechanism refers to a networking standard that allows a computing device to be turned on by a network message. In some examples, the WOL mechanism may be coupled to the apparatus 100. The WOL mechanism may include a WOL configuration parameter. In some examples, the WOL configuration parameter may be transferred between the apparatus 100 and the host computing device. In some examples, the WOL configuration parameter may correspond to a configuration parameter to notify the host computing device that the apparatus 100 is able to wake upon receipt of a network message from the host computing device. That is, the WOL mechanism may enable the apparatus 100 to be woken upon receipt of a network message. In such examples, the network message to wake the apparatus 100 may be a 'magic packet' and include instructions to wake the apparatus 100. In addition, the network message may be included within the first signal transmitted by the host computing device to the apparatus 100.

In some examples, a WOL state of the apparatus may have a particular parameter or set of parameters associated with the WOL state. In some examples, a parameter may be based on a Basic Input/Output System (BIOS) setting of the host computing device. As used herein, BIOS refers instructions used to perform hardware initialization during startup of a computing device, as well as to provide runtime services for operating systems and programs. As used herein, a BIOS setting refers to a particular setting related to BIOS functionality. For example, a BIOS setting may relate to an order in which functionality of devices such as a hard drive, USB port, or optical drive are enabled on the computing device. Examples are not so limited, however, and any BIOS setting may be the basis for a parameter associated with the WOL state of apparatus 100.

Figure 2:
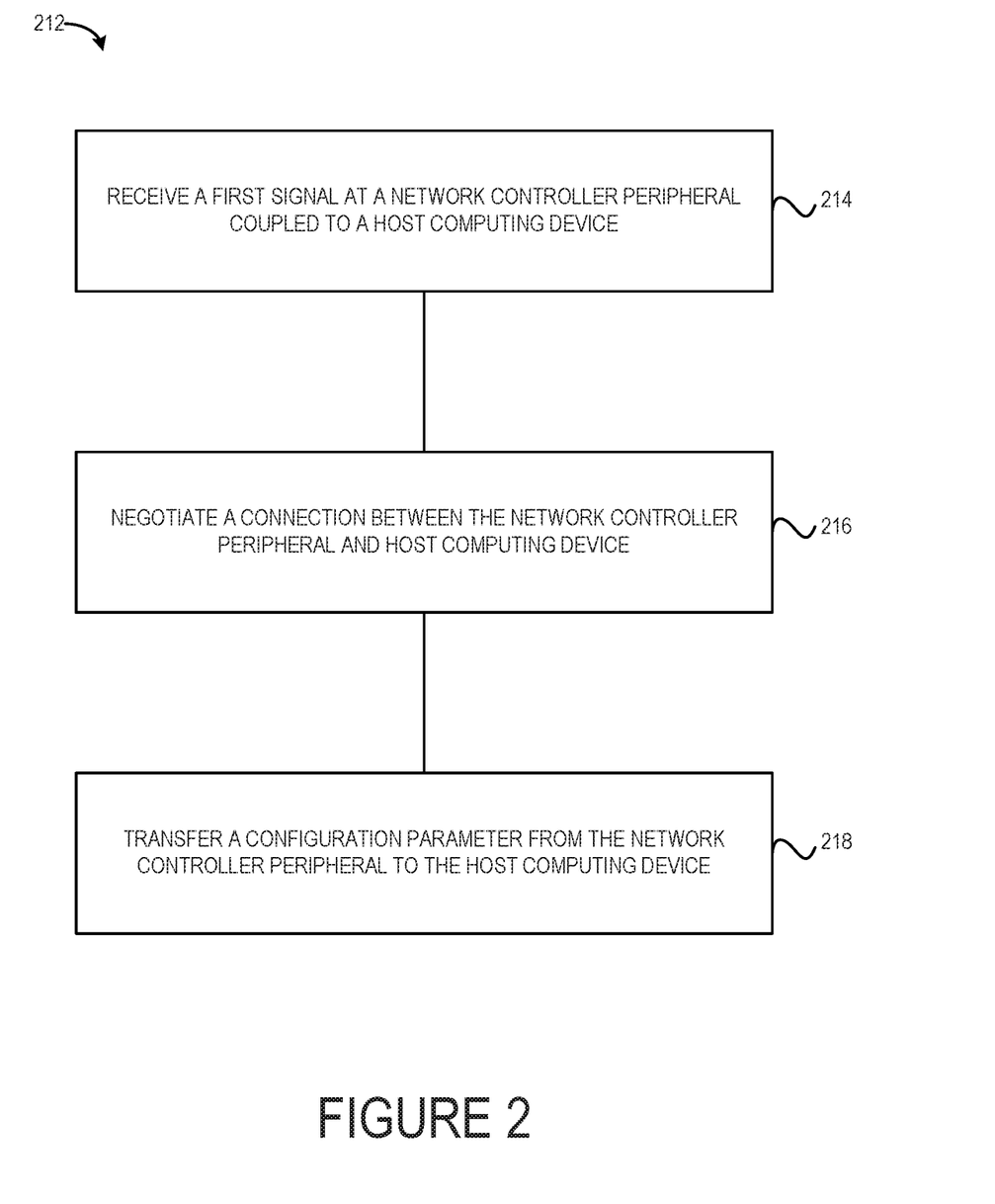
FIG. 2 is an example method for configuration parameter transfer consistent with the disclosure.

FIG. 2 is an example method 212 for configuration parameter transfer according to the present disclosure. At 214, method 212 may include receiving a first signal at a network controller peripheral. The network controller peripheral may be akin to apparatus 100 discussed previously with respect to FIG. 1, and may be a docking device. In some examples, the network controller peripheral may be coupled to a host computing device. The host computing device may be in a non-active power state. That is, as discussed with respect to FIG. 1, the host computing device may be in a power state in which power is supplied to the host computing device but applications on the host computing device are not running. As described previously, the host computing device may be in an S1, S2, S3, S4, or S5 state.

Receiving a first signal at a network controller peripheral at 214 may include receiving a first signal at the network controller peripheral when the signal is transmitted by the host computing device. As described previously with respect to FIG. 1, the signal may be received at the network controller peripheral via a USB Type C connection between the network controller peripheral and the host computing device. The first signal may be an interrupt signal, a wake signal such as a WOL signal, or any other type of signal.

At 216, method 212 may include negotiating a connection between the network controller peripheral and the host computing device. Negotiating a connection between the network controller peripheral and the host computing device at 216 may begin with the receipt of the first signal at the network controller peripheral. In some examples, the first signal may be received at a Network Interface Controller (NIC) of the network controller peripheral. As used herein, a NIC refers to a hardware component that connects a computing device to a network. The NIC may include electronic circuitry to receive signals and allow the computing device to communicate with other devices on the network.

Upon receiving the first signal at a NIC of the network controller peripheral, an interrupt signal may be generated at the network controller peripheral. As described with respect to FIG. 1, an interrupt signal refers to a signal indicating that an event needing attention has occurred. In some examples, the interrupt signal may be generated in response to the receipt of the first signal at a NIC of the network controller peripheral.

The interrupt signal may be a signal to interrupt a microcontroller of the host computing device. As used herein, a microcontroller refers to hardware containing circuitry enabling interaction and interfacing with a peripheral device. Microcontrollers may include a processor, a memory, and/or a programmable peripheral. In some examples, the microcontroller may be integrated into the host computing device. In such examples, the microcontroller may serve to allow the host computing device to interface with a peripheral device, such as a network controller peripheral, when the network controller peripheral is coupled to the host computing device.

In response to receiving an interrupt signal, the microcontroller may build a message. The message may include information regarding the first signal, as well as additional information to enable the host computing device to negotiate a connection with the network controller peripheral. Once the message has been built at the microcontroller, the message may be transmitted to the host computing device. In some examples, the host computing device may receive the message including information regarding the first signal and may process the first signal included within the message. Once the host computing device has processed the first signal, a connection may be negotiated and enabled between the host computing device and the network controller peripheral. The connection may allow data and messages to be transferred between the host computing device and the network controller peripheral.

At 218, method 212 may include transferring a configuration parameter from the network controller peripheral to the host computing device. In some examples, transferring a configuration parameter to the host computing device from the network controller peripheral may include transferring a MAC address from the network controller peripheral. In some examples, the host computing device may remain in the non-active power state when the configuration parameter is transferred to the host computing device. That is, the configuration parameter may be transferred to the host computing device to the network controller peripheral without the host computing device entering an active power state. As described previously with respect to FIG. 1, the host computing device may be in a non-active power state, such as an S1, S2, S3, S4, or S5 state. In other examples, the configuration parameter may be transferred from the network controller peripheral to an active power state host computing device. That is, the host computing device may be in an active power state.

In some examples, method 212 may include coupling the network controller peripheral to the host computing device when the host computing device is in an active state. As used herein, an active state refers to a state in which all components of a computing device may be fully usable and receiving power. In some examples, a connection between the network controller peripheral and the active state host computing device may be negotiated. The negotiation of the connection may be similar to the negotiation described previously with respect to negotiation between a network controller peripheral and a non-active power state host computing device.

Method 212 may further include transferring a configuration parameter from the host computing device to the network controller peripheral when the host computing device is in an active state. The configuration parameter may be a MAC address, an HBMA, or any other configuration parameter. In some examples, the configuration may be transferred in response to a connection being negotiated between the network controller peripheral and the active-state host computing device.

Figure 3:
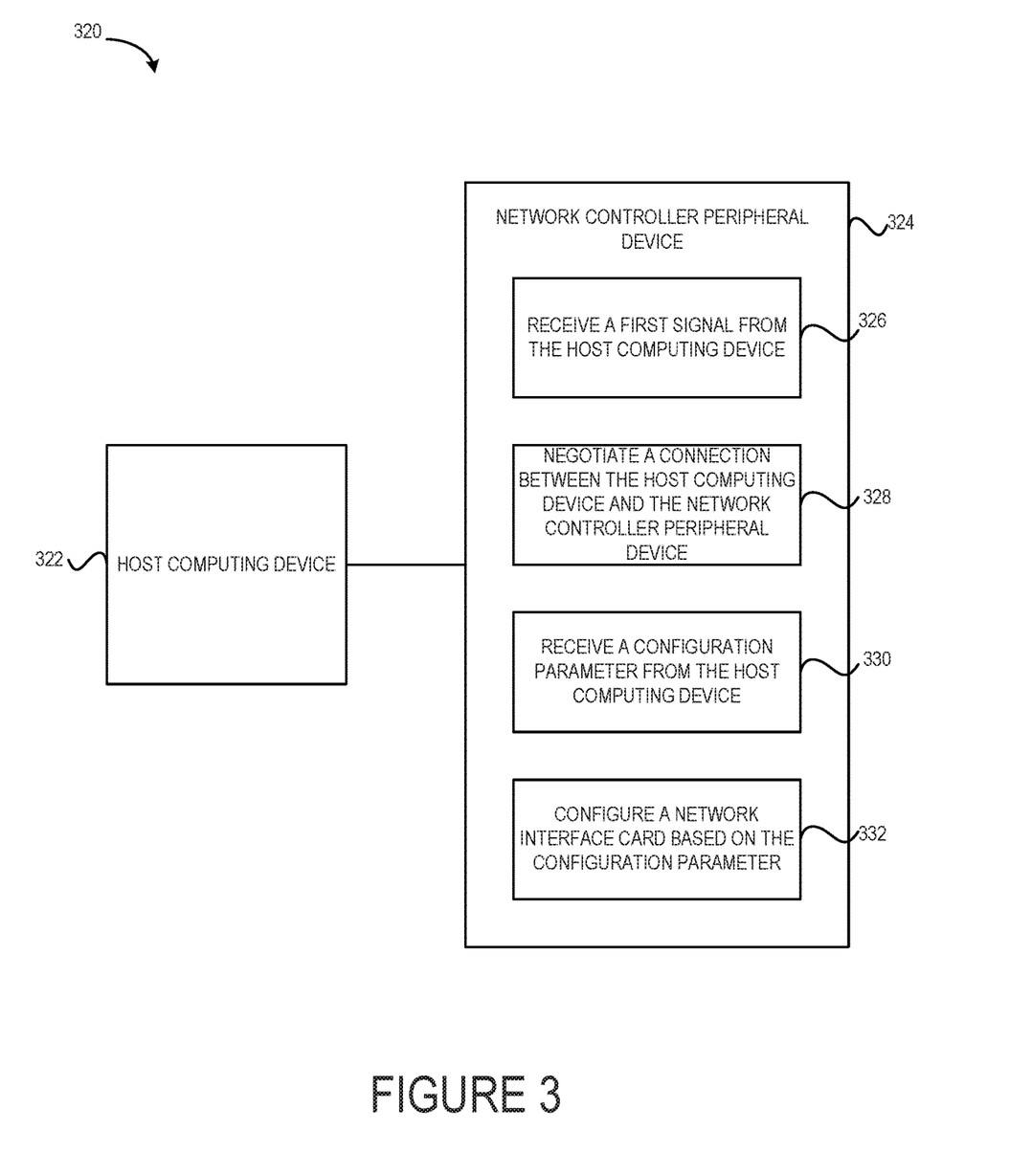
FIG. 3 is an example system for configuration parameter transfer consistent with the disclosure.

FIG. 3 is an example system 320 for configuration parameter transfer according to the present disclosure. System 320 may include a host computing device 322. As described previously, host computing device 322 may refer to a device including a processing resource, memory, and input/output interfaces for wired and/or wireless communication and may be a laptop computer, a desktop computer, a mobile device, and/or other wireless devices, although examples of the disclosure are not limited to such devices. System 320 may further include a network controller peripheral device 324. Network controller peripheral device 324 may be a USB Type C device. In some examples, network controller peripheral device 324 may be a docking device. In such examples, network controller peripheral device 324 may dock to the host computing device 322. As shown in FIG. 3, the network controller peripheral device 324 may be coupled to host computing device 322.

At 326, network controller peripheral device 324 may receive a first signal from the host computing device. As described previously with respect to FIGS. 1 and 2, the signal may be an interrupt signal, a wake signal, or any other type of signal. In some examples, the signal may be received at network controller peripheral device 324 in response to the network controller peripheral device 324 being coupled to host computing device 322.

At 328, network controller peripheral device 324 may negotiate a connection with host computing device 322. As described with respect to FIG. 2, a connection may be initiated in response to the network controller peripheral device 324 receiving a first signal from host computing device 322. A connection may be negotiated through a series of messages, including, for example, an interrupt message transmitted to host computing device 322 and/or a message generated on host computing device 322 that may include the first signal received by network controller peripheral device 324.

At 330, network controller peripheral device 324 may receive a configuration parameter from host computing device 322. In some examples, the configuration parameter may be received at a NIC of the network controller peripheral device 324. As described previously, the configuration parameter may be a MAC address, an HBMA, or any other suitable configuration parameter. In some examples, the configuration parameter may be received at network controller peripheral device 324 in response to successful negotiation of a connection between host computing device 322 and network controller peripheral device 324.

At 332, network controller peripheral device 324 may configure a state of the NIC. As used herein, configuration of a state of the NIC refers to configuring the NIC in response to receiving a particular configuration parameter, such that the NIC complies with the particular parameter. For example, if a WOL parameter is transmitted to the network controller peripheral device 324, a portion of the NIC corresponding to WOL may be enabled to allow WOL support. Examples are not so limited, however, and any configuration of a state of the NIC may be used. In some examples, the configuration of a state of the NIC may be based on the received configuration parameter.

In some examples, network controller peripheral device 324 may receive an HBMA associated with host computing device 322 from host computing device 322. Network controller peripheral device 324 may determine that an HBMA has been received. In some examples, network controller peripheral device 324 may overwrite a MAC address of the network controller peripheral device 324. That is, the network controller peripheral device 324 may substitute an associated MAC address with a different address. In some examples, the network controller peripheral device 324 may overwrite the associated MAC address with the HBMA associated with host computing device 322. Said differently, network controller peripheral device 324 may substitute the received HBMA of host computing device 322 for the MAC address of network controller peripheral device 324 in response to a determination that an HBMA has been received. As a result, network controller peripheral device 324 may have a MAC address that is the same as the HBMA associated with the host computing device 322. This may aid in ensuring that the network controller peripheral device 324 is a trusted peripheral device such that host computing device 322 may interface with network controller peripheral device 324.

In some examples, an HBMA may not be transferred from host computing device 322 to network controller peripheral device 324. In such examples, network controller peripheral device 324 may determine that an HBMA has not been received. In some examples, the network controller peripheral device 324 may determine that an HBMA has not been received after waiting a threshold period of time from the negotiation of a connection between host computing device 322 and network peripheral device 324.

If network controller peripheral device 324 determines that an HBMA has not been received from host computing device 322, network controller peripheral device 324 may use an associated MAC address of the network controller peripheral as the MAC address for the network controller peripheral. Said differently, network controller peripheral device 324 may refrain from overwriting the MAC address of the network controller peripheral device 324 with a different MAC address, such as an HBMA. In some examples, the MAC address associated with network controller peripheral device 324 may be transferred to host computing device 322 via a connection between network controller peripheral device 324 and host computing device 322. Transferring the MAC address associated with network controller peripheral device 324 to host computing device 322 may serve to inform host computing device 322 of the identity of the particular network controller peripheral device.

Figure 4:
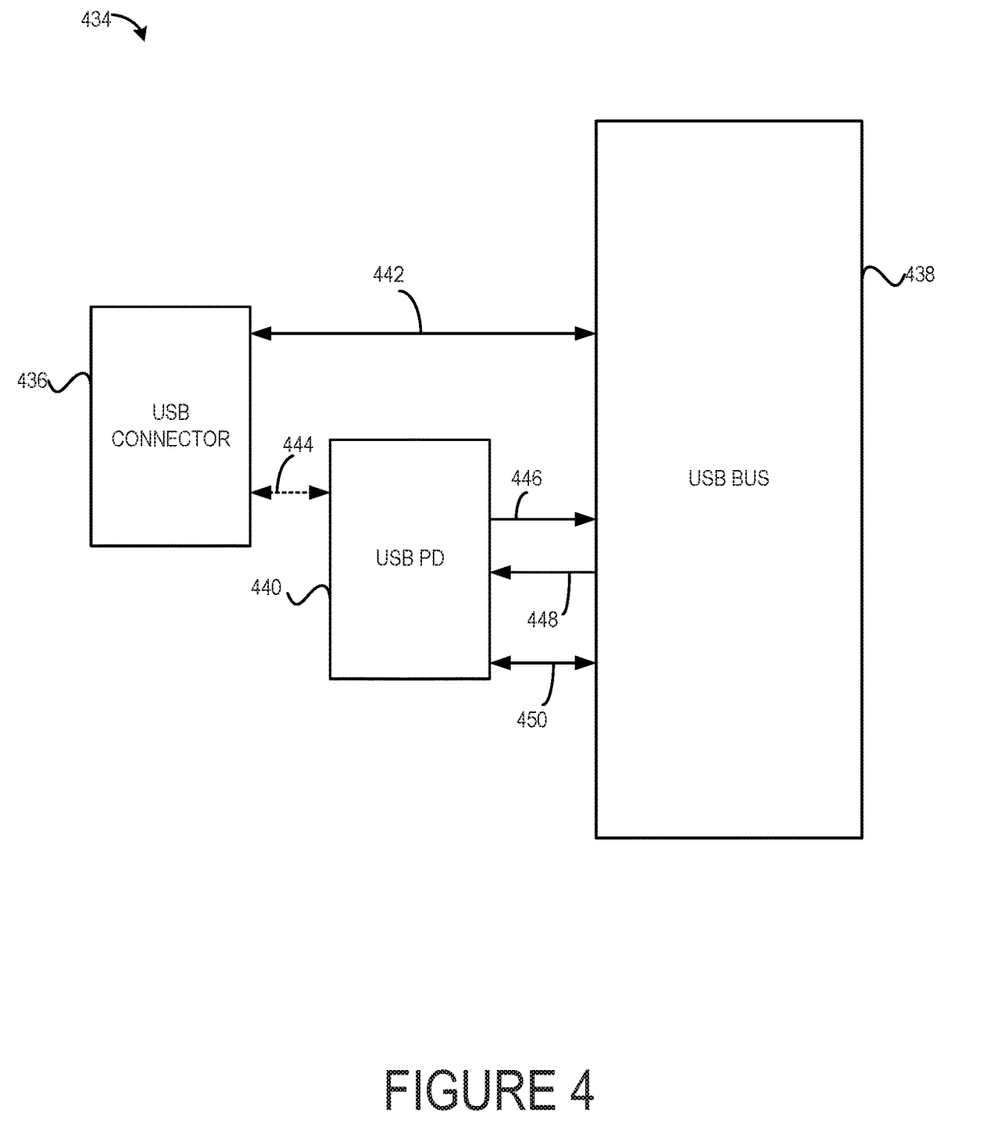
FIG. 4 is an example system for configuration parameter transfer consistent with the disclosure.

FIG. 4 is an example system 434 for configuration parameter transfer according to the present disclosure. System 434 may include a USB connector 436. As described previously, USB connector 436 may be a USB Type C connector. USB connector 436 may communicate with USB Bus 438. As used herein, a bus refers to a system for transferring data between and/or among components of a device. USB Bus 438 may transfer data between USB connector 436 and an external device to which USB connector 436 may be coupled. USB Bus 438 may include control circuitry. The control circuitry may be physical circuitry or may be instructions, and may include, for example, a controller, a NIC, or any other suitable hardware or instructions. USB Bus 438 may be able to receive power from a USB Power Delivery mechanism, such as USB Power Delivery mechanism 440, discussed further herein. In some examples, the power may be equivalent to three volts.

System 434 may further include a USB Power Delivery mechanism 440. As used herein, a USB Power Delivery mechanism refers to a particular USB specification that controls power. A USB Power Delivery mechanism 440 may allow a USB to draw varying amounts of power, as opposed to drawing a static amount of power. Additionally, a USB Power Delivery mechanism 440 may allow transfer of power in more than one direction. For example, with a USB Power Delivery mechanism 440, either a host, such as a host computing device, or a peripheral, such as a network controller peripheral device, is able to provide power. In some examples, the particular device providing power may depend on which device has power and/or which device has an excess amount of power. USB Power Delivery mechanism 440 may include control circuitry. The control circuitry may be physical circuitry or may be instructions executable by a processing resource, and may include, for example, a controller, a NIC, or any other suitable hardware or instructions.

As shown in FIG. 4, USB connector 436 and USB Bus 438 may exchange information, indicated by arrow 442. Information may be transmitted from USB connector 436 to USB Bus 438 and from USB Bus 438 to USB connector 436. USB connector 436 may further exchange configuration information via a configuration channel with USB Power Delivery mechanism 440, as indicated by arrow 444. In some examples, arrow 444 may represent information corresponding to an increase in USB current. The current may be drawn by USB connector 436; in such examples, arrow 444 may represent a request from USB Power Delivery mechanism 440 to support the increased current.

USB Power Delivery mechanism 440 may further communicate with USB Bus 438. For example, USB Power Delivery mechanism 440 may communicate an "enable" message to USB Bus 438, indicated by arrow 446. The enable message may include a message to enable, for example, WOL support on USB Bus 438. In some examples, USB Bus 438 may receive a message such as a WOL message. USB Bus 438 may transmit a "wake" message to USB Power Delivery mechanism 440, indicated by arrow 448. In some examples, the message represented by arrow 448 may alert USB Power Delivery mechanism 440 that power to the USB connector 436 and/or the USB Bus 438 is to be provided.

In addition, USB Power Delivery mechanism 440 and USB Bus 438 may exchange information relating to an HBMA, indicated by arrow 450. As discussed with respect to FIG. 3, a peripheral device including a USB connection may receive an HBMA from a host computing device. Upon receiving the HBMA, the peripheral device may overwrite its MAC address with the HBMA. This may involve use of power from the USB Power Delivery mechanism 440 to the USB Bus 438 to perform this overwrite. Additionally, USB Power Delivery mechanism 440 may receive the HBMA from the USB Bus 438; this may allow USB Power Delivery mechanism 440 to better communicate and facilitate interaction between the peripheral device and the host computing device.

In the foregoing detail description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that structural changes may be made without departing from the scope of the present disclosure.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense. Further, as used herein, "a number of" an element and/or feature can refer to any number of such elements and/or features.

What is claimed:

1. An apparatus, comprising:
a memory resource storing executable instructions; and
a processing resource to execute the instructions stored on the memory resource to:
receive a first signal from a host computing device;
initiate communications with the host computing device in response to receiving the first signal;
receive a configuration parameter from the host computing device in response to initiation of communications with the host computing device;
determine whether a Host Based Media Access Control Address (HBMA) associated with the host computing device has not been received; and
in response to the HBMA not being received, use a Media Access Control (MAC) address of the apparatus as the MAC address.

2. The apparatus of claim 1, wherein the first signal is an interrupt signal.

3. The apparatus of claim 1, further comprising receiving the HBMA from the host computing device.

4. The apparatus of claim 1, wherein transferring the configuration parameter comprises transferring the configuration parameter from the host computing device that is in a low power state.

5. The apparatus of claim 1, further comprising a Wake on LAN (WOL) configuration parameter and mechanism coupled to the apparatus to activate a WOL state of the apparatus in response to the apparatus being coupled to the host computing device, wherein a parameter associated with the WOL state of the apparatus is based on a Basic Input/Output System (BIOS) setting of the host computing device.

6. A method, comprising:
receiving, by a network controller peripheral device coupled to a host computing device, a first signal, wherein the host computing device is in a low power state;
negotiating, by the network controller peripheral device, a connection between the network controller peripheral device and host computing device;
transferring, by the host computing device, a configuration parameter from the host computing device to the network controller peripheral device, wherein the host computing device remains in the low power state;
determining, by the network controller peripheral device, whether a Host Based Media Access Control Address (HBMA) associated with the host computing device has not been received;
using, by the network controller peripheral device in response to the HBMA not being received, a Media Access Control (MAC) address of the network controller peripheral device as the MAC address; and
configuring, by the network controller peripheral device, a Network Interface Card (NIC) of the network controller peripheral device using the configuration parameter.

7. The method of claim 6, further comprising:
coupling the network controller peripheral device to the host computing device; and
transferring the configuration parameter from the host computing device to the network controller peripheral device.

8. The method of claim 6, wherein negotiating a connection between the network controller peripheral device and host computing device includes:
receiving the first signal at the network controller peripheral device;
transmitting an interrupt message to the host computing device by the network controller peripheral device to interrupt a microcontroller of the host computing device in response to receiving the first signal;
causing the microcontroller to build a configuration message in response to receiving the first signal; and
transmitting the configuration message to the network controller peripheral device.

9. The method of claim 8, further comprising:
receiving the message including the first signal at the network controller peripheral device; and
processing the first signal.

10. The method of claim 6, wherein transferring the configuration parameter to the network controller peripheral device from the host computing device includes transferring a Media Access Control (MAC) address to the network controller peripheral device.

11. A system, comprising:
a host computing device; and
a network controller peripheral device coupled to the host computing device, wherein the network controller peripheral device is to:
receive a first signal from the host computing device;
negotiate a connection between the host computing device and the network controller peripheral device;
receive a configuration parameter from the host computing device;
determine whether a Host Based Media Access Control Address (HBMA) associated with the host computing device has not been received;
in response to the HBMA not being received, use a Media Access Control (MAC) address of the network controller peripheral device as the MAC address; and
configure a Network Interface Card (NIC) based on the configuration parameter.

12. The system of claim 11, further comprising the network controller peripheral device to:
receive an HBMA associated with the host computing device; and
overwrite a MAC address of the network controller peripheral device with the HMBA.

13. The system of claim 11, wherein the network controller peripheral device is a Universal Serial Bus Type C (USB Type C) device.

14. The system of claim 11, wherein the network controller peripheral device is a docking device to dock to the host computing device.

* * * * *